United States Patent
Willwerth et al.

[19]

[11] Patent Number: 6,019,205

[45] Date of Patent: Feb. 1, 2000

[54] METHOD AND APPARATUS FOR LINED CLUTCH PLATE

[75] Inventors: John Willwerth, Rochester Hills; Gregory J. Guitar, Roseville, both of Mich.

[73] Assignee: Raytech Automotive Components Company, Sterling Heights, Mich.

[21] Appl. No.: 09/108,533

[22] Filed: Jul. 1, 1998

[51] Int. Cl.[7] .............................. B32B 31/18; F16D 69/04
[52] U.S. Cl. ........................ 192/107 R; 29/417; 156/517
[58] Field of Search ............................. 192/70.14, 107 R, 192/113.36, 107 M; 156/263, 265, 517, 521; 29/415, 417

[56] References Cited

U.S. PATENT DOCUMENTS

| | | | |
|---|---|---|---|
| 1,681,371 | 8/1928 | Slade | 192/107 M |
| 2,079,173 | 5/1937 | Judd | 192/107 M |
| 2,149,483 | 3/1939 | Whitelaw | 192/107 M |
| 2,175,399 | 10/1939 | Judd | 192/107 M |
| 2,749,264 | 6/1956 | Emrick . | |
| 2,947,388 | 8/1960 | Culbertson . | |
| 2,966,737 | 1/1961 | Spokes et al. . | |
| 3,250,349 | 5/1966 | Byrnes et al. . | |
| 4,260,047 | 4/1981 | Nels . | |
| 4,449,621 | 5/1984 | F'Geppert . | |
| 4,502,581 | 3/1985 | Komatsu . | |
| 4,585,104 | 4/1986 | Komatsu . | |
| 4,674,616 | 6/1987 | Mannino, Jr. . | |
| 5,094,331 | 3/1992 | Fujimoto et al. . | |
| 5,184,704 | 2/1993 | Hays . | |
| 5,332,075 | 7/1994 | Quigley et al. . | |
| 5,409,091 | 4/1995 | Reik et al. . | |
| 5,413,202 | 5/1995 | Maucher . | |
| 5,419,422 | 5/1995 | Schraut . | |
| 5,460,255 | 10/1995 | Quigley . | |
| 5,562,793 | 10/1996 | Menard | 156/263 |
| 5,571,372 | 11/1996 | Miyaishi et al. . | |
| 5,605,210 | 2/1997 | Koike et al. . | |
| 5,615,758 | 4/1997 | Nels . | |
| 5,776,288 | 7/1998 | Stefanutti et al. | 156/263 |
| 5,842,551 | 12/1998 | Nels | 192/107 M |

OTHER PUBLICATIONS

Fuji Polymertech KK, Abstract of Publication No. 07–197, 945, published Aug. 1, 1995, Application No. 05–349,112 [JP 93349112], Filed Dec. 28, 1993.

Tochigi Fuji Ind. Co. Ltd., Abstract of Publication No. 03–028523, published Feb. 6, 1991, Application No. 01–160, 866 [JP 89160866] Filed Jun. 26, 1989.

Fuji Kagaku Kogyo KK, Abstract of Publication No. 60–172,727, published Sep. 6, 1985, Application No. 59–025,908 [JP 8425908], Filed Feb. 14, 1984.

Tochigi Fuji Ind. Co. Ltd, Abstract of Publication No. 60–164048, published Aug. 27, 1985, Application No. 59–019,269 [JP 8419269] Filed Feb. 3, 1984.

Tochigi Fuji Ind. Co. Ltd, Abstract of Publication No. 60–164,047, published Aug. 27, 1985, Application No. 59–019,109 [JP 8419109], Filed Feb. 2, 1984.

*Primary Examiner*—Rodney H. Bonck
*Attorney, Agent, or Firm*—Brooks & Kushman, P.C.

[57] ABSTRACT

A method and apparatus for assembling a clutch plate includes forming arcuate segments from a friction material sheet, applying the arcuate segments to the ring in a fixed location with a temporary adherent, preferably to define intermediate spaces between the arcuate segments, and bonding the arcuate segments to the annular ring surface to form an automatic transmission clutch plate. Preferably, a set of multiple arcuate segments with independent edge boundaries are applied in a single workstation, and one or more sets may be applied to each annular surface by appropriately indexing the ring with respect to the application equipment. Preferably, the arcuate segments are formed by stamping the segments from sheets, the cuttings arranged at closely spaced positions on the sheet to reduce friction material waste. Most preferably, the arcuate segment is formed by defining a perimeter of a strip on a sheet of friction material and slicing curves across said strip at spaced, adjacent positions, each curve matching the adjacent curve. Spaces between ends of adjacent arcuate segments on a clutch plate preferably form tapered lubrication grooves extending from the radially inner edge to the radially outer edge of the ring clutch plate.

12 Claims, 3 Drawing Sheets ns on a disc. The cost savings from use of the sheet
METHOD AND APPARATUS FOR LINED CLUTCH PLATE

TECHNICAL FIELD

The present invention relates generally to automatic transmission clutch plates, and more particularly to the method for forming and applying arcuate segments of friction-lining material to the side of the of an annular ring and bonding to assemble a clutch plate.

BACKGROUND ART

Automatic transmission clutch plates are flat annular rings having a friction lining applied to the annular sides. One or both sides are often covered with an annular ring of friction material lining sized for mating engagement with adjacent plates similarly lined. A lubricating medium such as transmission oil may communicate with the lined outer sides of the clutch plates in the clutch plate assembly to control engagement of the adjacent clutch plates. The friction lining was often similarly shaped as an annular ring and the annular ring is cut from sheet material. However, removal of an annular ring from a sheet material leaves a substantial portion of sheet material residue, for example, the circular internal portion and triangular outer portions of the sheet material. As a result, a substantial amount of the sheet of friction material is wasted during the production and assembly of lined clutch plates.

One previously known assembly eliminates the large areas of waste by cutting the friction lining as arcuate segments. However, the previously known process provided arcuate segments having interlocking end portions so that the segments are interconnected for accurate alignment on the sides of the annular ring forming the clutch plate. This interconnection and alignment assures proper installation of the friction lining on the side surface of the clutch plate ring. However, the interconnection of the segments complicates installation of the lining on the plate ring, since each segment must be handled so as to avoid disconnection of the interlocking tabs and slots of the friction lining segments. The connection forms an annular ring of separatable but interconnecting segments that must be transferred simultaneously to the side of the clutch plate ring. Moreover, the friction material must be modified before or after installation to include grooves, for example, by hot molding a plurality of parallel grooves in the friction material sheet, to provide fluid passages for lubrication communication between radially inner and outer edges of the clutch plate.

In addition, the previously known arcuate segments were shaped to conform with the shape of the annular ring. Accordingly, the outer radius of each arcuate segment is larger than the inner radius of the arcuate segment, conforming to the shape of the adjacent edges of the annular clutch plate ring to which the segments are applied. Thus, each arcuate segment must be spaced from an adjacent position of a segment to be cut from a friction material sheet to accommodate the different radii of adjacent curves. As a result, even when the segments are aligned closely adjacent each other, an amount of material must separate adjacent cuts. Accordingly, previous arcuate segment cutting limits the opportunity to reduce waste of the material used to form segments from a single sheet as numerous areas of wastage occur on each sheet between the segments to be cut from such an alignment on the sheet. Moreover, the arrangement and alignments of segments on each sheet may be diverse when the arrangement is configured to improve utilization of the friction material in the sheet. Cutting such diverse cutting paths can be extremely time consuming or require expensive software controls. In addition, complex arrangements or orientations of segments within the sheet can complicate handling, alignment and placement of the segments on a disc. The cost savings from use of the sheet material may be outweighed by the cost to deliver or align segments for attachment around an annular disc, and the difficulty of handling segments in a cost effective production operation.

In addition, it has also been known to extrude a long strand of friction material having a relatively small cross-section. The strand is then sliced into multiple small segments that can be applied to a clutch plate ring. However, such a structure substantially multiplies the number of pieces that must be formed, located and adhered to the ring. Accordingly, such an assembly can increase the opportunity to misalign the segments with respect to the annular shape of the ring and the adjacent segments. In addition, such a construction limits the ability to configure communication passages as spacings between the sliced segments and limits surface area of exposed friction lining.

SUMMARY OF THE INVENTION

The present invention overcomes the above-mentioned disadvantages by providing a method for lining a clutch plate ring, and an assembled clutch plate, that includes arcuate segments of friction material lining at spaced, adjacent positions along an annular clutch plate ring. The method improves production by limiting waste of friction material as the arcuate segments can be formed at closely aligned positions of matching curves to improve the area of the sheet of friction material to be utilized in forming the arcuate segments. In addition, the step of applying a plurality of segments to a side of the disk locates them in spaced, adjacent positions to provide lubrication channels without preforming or otherwise shaping the applied friction material. In addition, the arcuate segments are bonded at the spaced, adjacent positions by an adherent, preferably carried by the ring or the friction material, to be used in forming the clutch plate.

In the preferred embodiment, one or a plurality of forming presses may be used, sequentially or simultaneously, each press forming a plurality of segments by stamping, cutting or otherwise segregating individual segments from a sheet at closely spaced locations of matching curves along an elongated sheet of friction material. Unlike previously known arcuate segments, the segments are formed between the matching aligned curves extending across a sheet segment. In the preferred embodiment, the matching refers to spaced lines that are equidistant from adjacent lines, for example, that may be simple curves having equal radii as shown in FIG. 5, although it will be understood that other shapes such as compound curves and multiple radii curves may also be employed across the sheet segments without departing from the present invention. However, with the preferred embodiment, only minimal wedge restrictions of the sheet are unable to be used in forming arcuate segments to be applied to the annular plate. The lengths of the segments may be limited so as to minimize the differences between the area that can be covered by a segment formed between matching inner and outer contours, and the area covered between a larger outer radius and a smaller inner radius as in the previously known arcuate segments.

Preferably, a plurality of presses at a stamping station are aligned at separated positions for applying multiple segments to a single ring. In addition, the station or adjacent stations index the ring so that additional sets of arcuate segments can be applied between previously aligned segments, or on both first and second sides of the ring before the bonding step is executed to adhere the arcuate segments at spaced adjacent locations on the annular ring.

The present invention also provides a lined clutch plate on which an adherent secures a plurality of spaced adjacent arcuate segments on an annular ring, an intermediate portion of the ring between arcuate segments forming a groove for lubrication communication from the radially inner edge to the radially outer edge of the clutch plate. The grooves may be aligned as desired, or avoided if preformed or subsequently formed grooves are available, for example by pressing grooves during the bonding operation, for lubrication passages.

Thus, the present invention avoids the need for complex interlocking relationships between adjacent arcuate segments of lining configured to a clutch plate ring. In addition, the invention improves efficient use of friction material sheets by stamping closely spaced adjacent arcuate segments. Moreover, the forming or applying apparatus segment may be aligned along multiple axes for installing multiple segments at separated positions along the annular ring, and indexing the ring to align multiple sets of arcuate segments at separated positions.

The clutch plate assembly includes channels or grooves between edges of adjacent arcuate segments to provide lubrication passageways between the radially inner and outer portions of the clutch plate where the friction material is not subjected to a grooving operation. Alternatively, the segments can be closely positioned where grooves are preformed in the friction material or are incorporated after application, for example, during a pressurized bonding operation. In addition, one or both opposing sides of the clutch plate ring can be provided with friction material, the number, size and shape of the arcuate segments being adjustable to improve production efficiency.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT

Figure 1:
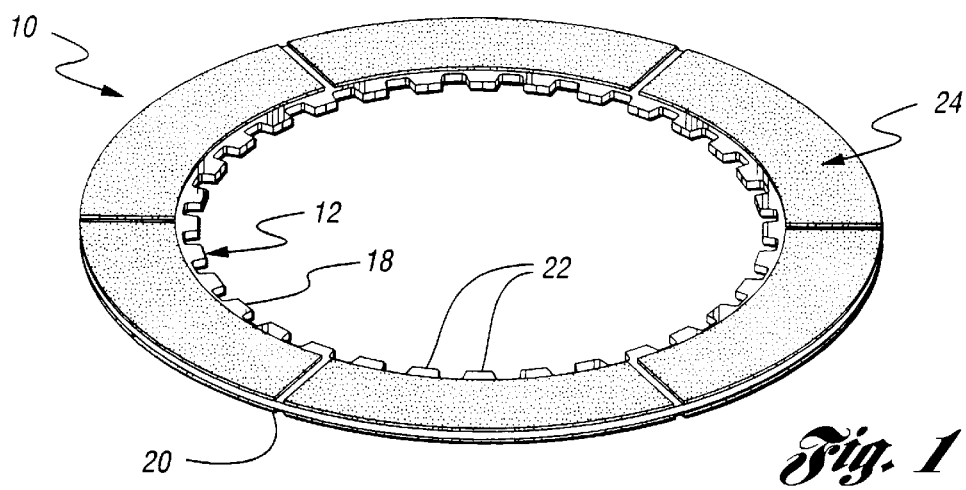
FIG. 1 is a perspective view of a clutch plate constructed in accordance with the present invention.

Referring first to FIG. 1, a clutch plate 10 is thereshown comprising an annular substrate or ring 12, preferably a metal plate such as steel. The ring 12 has annular sides 14 and 16 between a radially inner edge 18 and a radially outer edge 20. The inner or outer radial edge may include a plurality of splined teeth 22 for engagement with splines in a well known manner for use in automatic transmissions. As is also well known, each of the annular sides 14 and 16 of the ring 12 carry a lining 24, although only one or both sides may be lined.

Figure 2:
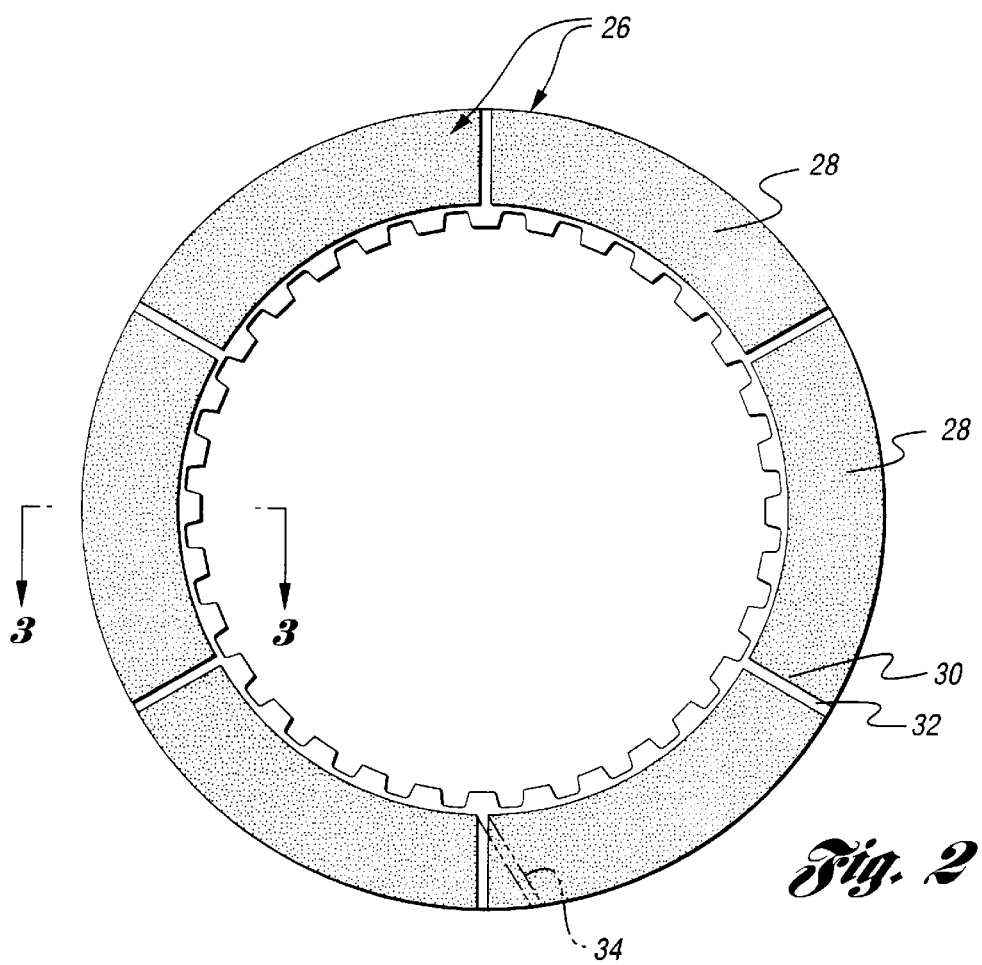
FIG. 2 is a plan view of the clutch plate shown in FIG. 1.
Figure 3:
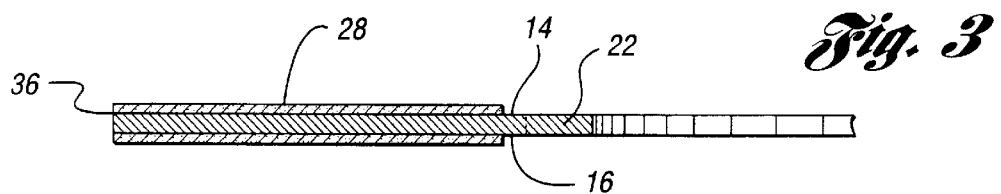
FIG. 3 is a sectional view taken substantially along the line 3—3 in FIG. 2.

As best shown in FIG. 2, a lining 24 comprises a plurality of arcuate segments 26. In the preferred embodiment, each segment 28 is sized to cover a portion of the annular surface. For example, a segment length slightly less than about ⅙ of the annular surface 14 or 16 is shown in FIG. 2. In addition, each arcuate segment 28 has radially aligned edges that are substantially parallel to each other, although it is to be understood that the circumferential edges 30 are independent edge boundaries that can be aligned at other angles or aligned at angles with respect to each other depending upon the need for lubrication passage, the number of spaces, and the directions in which the passages are formed in the spacing 32. For example, an inclined spacing between segments 28 is shown in phantom line at 34. Moreover, lubrication passages may be pressed or otherwise formed in the friction material, whereby the independent edge boundaries, that is, the segment ends without interdigitated tabs and slots, may abut each other.

In the preferred embodiment, the ring 12 may be stamped from a coated metal sheet. Another preferred production process comprises blanking the annular rings by stamping from a coiled sheet of steel, then acid etching the blanks for improved adherence of a coating. The coating, preferably a commercially available adhesive, is applied to the blanks. The layer of adhesive coating forms a temporary bond when adjacent segments 28 are positioned upon the ring as well as a permanent bond between the lining 24 and the ring 12 when bonded to the ring in a manner to be described in greater detail below. Nevertheless, other methods of interposing an adherent between the lining and the ring 12 are also within the scope of the present invention, and a separate adherent coating step could be performed during the assembly of the lining to the ring. Typically, a thermosetting adherent may be tacky upon partial heating when the segments 28 are engaged against the surface of the ring to fixedly locate the segments in position on the surfaces 14 and 16. The bonding step preferably provides enhanced application of heat under pressure for a time duration in a manner consistent with known bonding processes to permanently bond the lining 24 to the ring 12. Nevertheless, it will be understood that the parameters of time, temperature and pressure may vary as necessary depending on the composition of the friction material, the adherent and the substrate.

Figure 4:
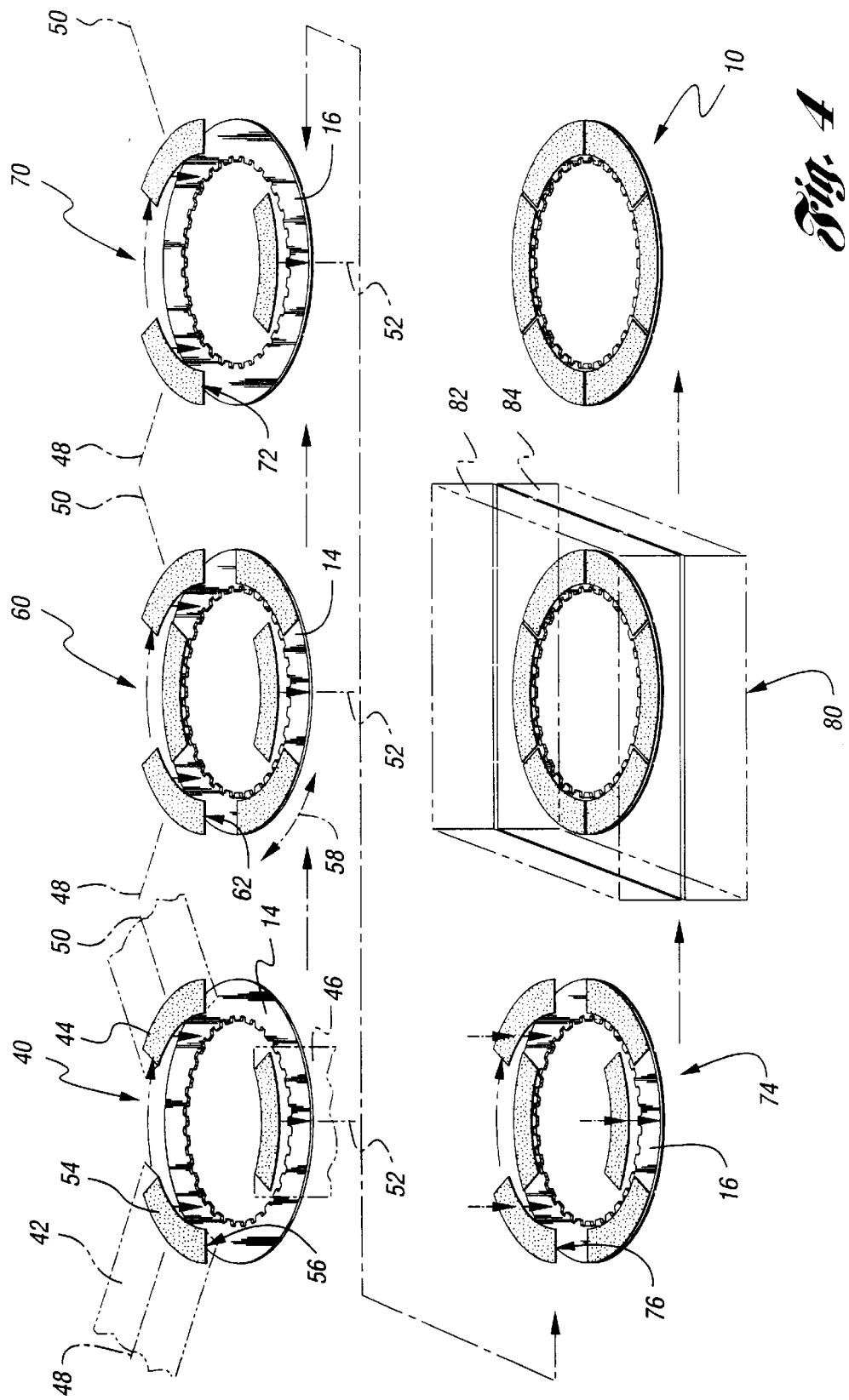
FIG. 4 is a perspective view of work stations performing method steps in accordance with the method of the present invention.

Referring now to FIG. 4, a workstation 40 is thereshown in which a step of forming arcuate segments 28 of friction material is represented. Preferably, to form segments of the size and shape of segments 28, three sheets 42, 44 and 46 of friction material are shown aligned along mutually spaced feed paths 48, 50 and 52 aligned at 120° to the adjacent paths. Along each path, a cutter such as a stamping die 54 forms an arcuate segment 28 from the respective sheets 42, 44 and 46. At each segment cutting location, the stamping can be displaced toward the ring, for example, by movement of the die, and pressed into a fixed location on the annular surface 14 of the ring 12. Pressing of the first set 56 of the multiple segments 28 locates a segment at a position in registration with the centerline of paths 48, 50 and 52 to cover separated portions of the surface 14.

As shown at station 60, the first set 56 of segments 28 are shown indexed by rotation of the ring as shown diagrammatically by arrow 58 so that the unlined surface portions of the ring 12 are aligned along the axes 48, 50 and 52, respectively. Accordingly, a second set 62 of arcuate segments 28 are stamped and applied to the surface 14 at locations intermediate the segment locations of the first set 56. Of course, it is to be understood that the stations 40 and 60 are not necessarily physically separated, and may represent two functional modes of a single work station. In addition, the number of segments and total number of stations utilized is optional.

Additional but optional forming and applying steps are represented at station 70 where a third set 72 of arcuate segments 28 are applied to the opposite side annular surface 16 of the ring 12 after an indexing operation exposes the surface 16, for example, flipping the ring on its fixture. Similarly, at station 74, a fourth set 76 of arcuate segments 28 is applied after rotary indexing of the ring, preferably similar to that described with reference to 58, to apply a fourth set 76 at locations intermediate the locations of segments in the first set 72 of arcuate segments 28 on the surface 16.

In order to reduce waste of friction material, a sheet may be formed as or partitioned into one or more strips defined by a perimeter. The perimeter may be defined by border edges of the sheet or cutting paths extending across the sheet. Regardless of whether the parameter is defined by borders of the sheet or cutting paths, a plurality of curves are sliced across the perimeter to form a plurality of immediately adjacent segments. The plurality of curves match and may be singularly radiused or may be defined by multiple radius curvatures that match the adjacent curves. Preferably, however, the radially outer edge of the segment preferably has a single radius that matches the radially outer radius of the clutch plate to which it is to be applied so that a large portion of the annular surface of the clutch plate ring is covered by the friction material. In such a case, although the radius at the radially inner edge of the friction lining segment does not match the radius of the radially inner edge of the annular plate, the circumferential length of the segment is limited so that the differences in radii do not leave a substantial portion of the annular plate uncovered. Moreover, if the arcuate segment is to be spaced slightly inwardly from the outer edge of the plate, the outer radius of the segment preferably matches the radius at the outer edge of the area covered by the segment.

Figure 5:
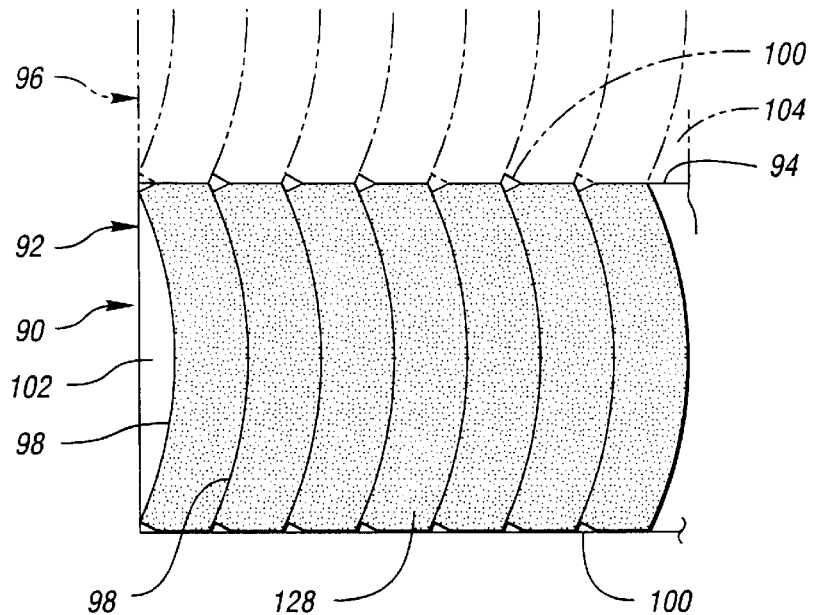
FIG. 5 is a plan view of a sheet of friction material showing a preferred segment arrangement of segments used in practicing the present invention.

As shown in FIG. 5, a strip 90 is formed with a perimeter 92. As shown in solid line in FIG. 5, the perimeter 92 forms a border around the strip 90. It should also be understood that the edge 94 could also actually be a cutting path that will separate the strip 90 from a larger sheet 96 as shown as phantom line at the top of FIG. 5. The sheet 96 may include a plurality of strips 90 depending on the length of the arcuate segments 128 to be cut from the friction material.

The strip 90 is sliced by any appropriate cutting or separating apparatus along a plurality of curves 98 having a matching radius. Although the preferred embodiment illustrated in FIG. 5 shows a single radius for each of the curves 98, each of the curves could be a complex curve so long as the curve 98 defining an edge of segment 128 matches the curve defining the opposite edge of the segment 128. Each adjacent segment formed will also include the matching curved edge so that no waste material must be retained between the segments 128.

In addition, a cut out perpendicular to the curve intersects the lateral edges of the segment at each border. A small wedge portion 100 may be removed to define the shape of the grooves to be formed between adjacent segments 128 applied to an annular clutch plate.

Figure 6:
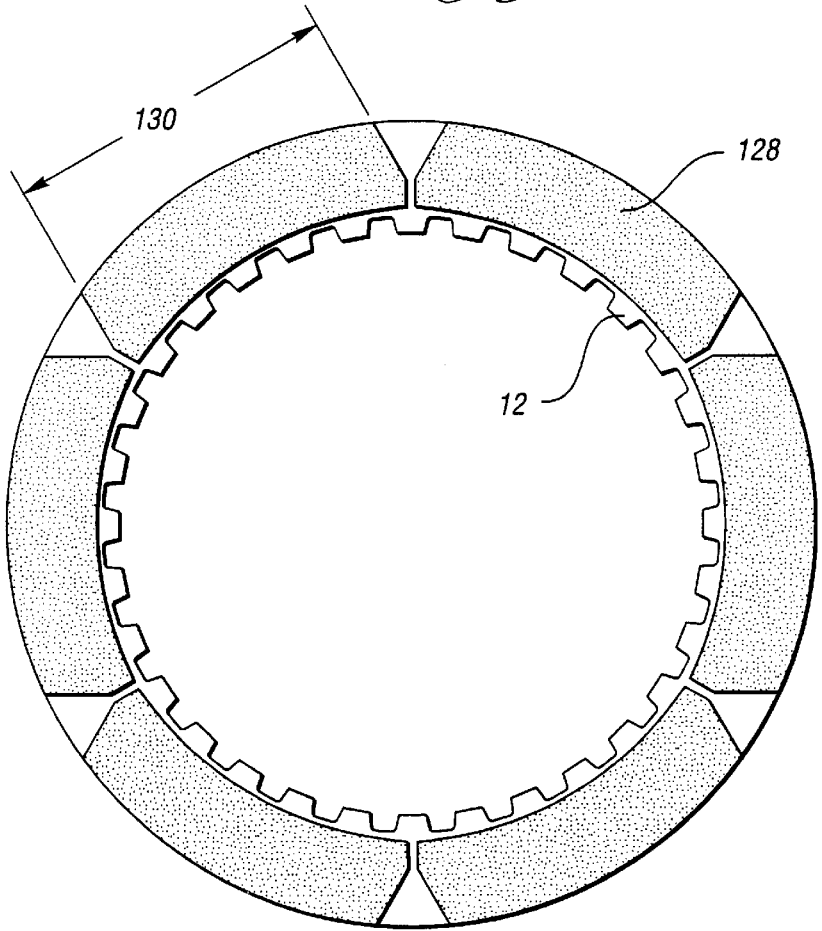
FIG. 6 is a plan view similar to FIG. 2 but showing the segments of FIG. 5.

As shown in FIG. 6, the truncations 100, preferably formed as perpendicular to the radius of the curves, form the entry of the groove defined by the separation of the ends of each segment 128. The truncation can be configured as desired to change the shape of the groove to adjust fluid flow across the clutch plate. Moreover, the truncation permits the segments to meet at their ends when they are aligned to abut against each other on the plate, at least along a portion of the segment. Nevertheless, the shape of the spacing between adjacent segments 128 applied to the ring 12 may be changed or eliminated as desired in order to control the flow of lubrication across the clutch plate.

In any event, the process improves the yield from each strip 90 or sheet 96 that may be cut with curves according to the present invention. The offal as shown at 102 and 104 is substantially reduced over the previously known arrangements and alignments of cuttings taken from the friction lining sheets. Moreover, the circumferential length 130 of each segment 128 is preferably limited so that the reduced area of friction lining due to the reduced area of friction lining due to the difference between the radius of radially inner edge of the segments 128 and the smaller radius of the inner edge of the annular clutch plate is reduced. As a result, the method leaves portions of the sheet unavailable for use in the formation of segments that cover a substantial portion of the surfaces 12 and 14 on the clutch plate ring. Moreover, a stack of sheets may also be sliced simultaneously to improve production efficiency. Alternatively, a single sheet may be stamped with multiple cutting heads to simultaneously slice a plurality of curves from a single sheet.

When all of the arcuate segments of friction material have been applied, and temporarily held in fixed locations, the assembled clutch plate is prepared for bonding by delivery to a station 80 at which heat and pressure are applied to the composite in a well known manner. The assembled clutch plate 10 is then ready for assembly with other clutch plates in an automatic transmission in a well known manner. Preferably, the intermediate spaces form lubrication passages when the friction material is not grooved or not to be grooved during bonding.

Having thus described the present invention, many modifications thereto will become apparent to those skilled in the art to which it pertains without departing from the scope and spirit of the present invention as defined in the appended claims. For example, sheets of friction material may already have preformed grooves, so that the spaces 32 may be eliminated and that the edges 30 of each arcuate segment will be applied to abut against each other for enhancing the exposed area of friction material on the clutch plate. In addition, the size and number of arcuate segments and the sequence of steps used in forming and applying the arcuate segments of friction material may be varied without departing from the scope and spirit of the present invention as defined in the appended claims.

What is claimed is:

1. A method for improving yield from friction material sheets to form lining segments for application to the annular sides of clutch plates, comprising:

defining a perimeter strip with at least one sheet of friction material; and slicing a plurality of curves across an entire width of said perimeter strip at spaced adjacent positions, each curve matching the adjacent curve.

2. The invention as defined in claim 1 wherein said slicing step comprises stamping said curves.

3. The invention as defined in claim 2 wherein said method includes defining a plurality of said perimeter strips on said sheet.

4. The invention as defined in claim 2 wherein said stamping step comprises simultaneously forming a plurality of said curves in said spaced, adjacent positions.

5. The invention as defined in claim 1 wherein said curve matches an edge of said annular side.

6. The invention as defined in claim 5 wherein said edge is a radially outer edge, and said curve is sliced at a radius not larger than said radially outer edge.

7. The invention as defined in claim 1 wherein said slicing step comprises sequentially slicing at least one segment at the border of an adjacent segment on said strip.

8. The invention as defined in claim 1 wherein said defining step comprises aligning at least one perimeter border on an edge of said friction material sheet.

9. A lined clutch plate comprising:

an annular ring having first and second sides;

a friction lining on at least one of said first and second sides, said friction lining comprising at least one set of a plurality of spaced, adjacent curved segments, each segment having a radially outer edge matching the radially inner edge of said segment, circumferential ends of at least two adjacent segments being spaced to form an intermediate space portion forming a groove between said adjacent segments at said space; and an adherent between said at least one of said first and second sides and each said at least one set of arcuate segments.

10. The invention as defined in claim 9 wherein said groove is radially tapered.

11. The invention as defined in claim 9 wherein said groove is aligned in part by parallel edges of said arcuate segments.

12. A lined clutch plate comprising:

an annular ring having first and second sides; a friction lining on at least one of said first and second sides, having at least one set of a plurality of arcuate segments having matching outer and inner curves, each segment having an independent edge boundary at each circumferential end:

an adherent between said at least one of said first and second sides and each said at least one set of arcuate segments; and lubricant passages formed by at least one of grooves in said friction lining and spacings between and independent edge boundaries.

* * * * *